(12) United States Patent
Katayama et al.

(10) Patent No.: US 11,667,176 B2
(45) Date of Patent: Jun. 6, 2023

(54) VEHICLE TAILGATE

(71) Applicant: YACHIYO INDUSTRY CO., LTD., Sayama (JP)

(72) Inventors: Hajime Katayama, Saitama (JP); Sho Notoya, Saitama (JP)

(73) Assignee: YACHIYO INDUSTRY CO., LTD., Sayama (JP)

( * ) Notice: Subject to any disclaimer, the term of this patent is extended or adjusted under 35 U.S.C. 154(b) by 0 days.

(21) Appl. No.: 17/796,037

(22) PCT Filed: Jan. 8, 2021

(86) PCT No.: PCT/JP2021/000558
§ 371 (c)(1),
(2) Date: Jul. 28, 2022

(87) PCT Pub. No.: WO2021/153200
PCT Pub. Date: Aug. 5, 2021

(65) Prior Publication Data
US 2023/0113676 A1    Apr. 13, 2023

(30) Foreign Application Priority Data
Jan. 29, 2020 (JP) .................. 2020-012203

(51) Int. Cl.
*B60J 5/10* (2006.01)
*B62D 35/00* (2006.01)
*B60J 1/00* (2006.01)
*B60J 1/18* (2006.01)

(52) U.S. Cl.
CPC .............. *B60J 5/107* (2013.01); *B60J 1/006* (2013.01); *B60J 1/18* (2013.01); *B62D 35/007* (2013.01)

(58) Field of Classification Search
CPC .............. B60J 5/107; B60J 1/006; B60J 1/18; B62D 35/007
See application file for complete search history.

(56) References Cited

U.S. PATENT DOCUMENTS

2013/0020822 A1* 1/2013 Inoue et al. ........... B60R 13/04
296/1.08

FOREIGN PATENT DOCUMENTS

| CN | 106882273 A * | 6/2017 | ............ B60J 5/107 |
|---|---|---|---|
| DE | 102015201748 A1* | 8/2016 | ............ B60J 5/107 |
| JP | 2002-01948 A | 1/2002 | |
| JP | 2003-237370 A | 8/2003 | |
| JP | 2006-298229 A | 11/2006 | |
| JP | 2008-037174 A | 2/2008 | |

(Continued)

OTHER PUBLICATIONS

PCT International Preliminary Report on Patentability (w/ English translation) for corresponding PCT Application No. PCT/JP2021/000558, mailed on Aug. 5, 2021, 6 pages.

(Continued)

*Primary Examiner* — Lori L Lyjak
(74) *Attorney, Agent, or Firm* — Dority & Manning, PA

(57) ABSTRACT

To improve the appearance of a tailgate provided with a rear spoiler, a tailgate of a vehicle includes a tailgate main body having a rear window opening a rear spoiler extending rearward from a part of the tailgate main body above the rear window opening a rear window panel that is mounted on an outer peripheral portion of the rear window opening of an outer surface of the tailgate main body and closes the rear window opening and a plate-shaped shield member mounted on a lower surface of the rear spoiler so as to shield a space formed between the lower surface of the rear spoiler and an upper end portion of the rear window panel.

8 Claims, 6 Drawing Sheets

(56) References Cited

FOREIGN PATENT DOCUMENTS

| | | |
|---|---|---|
| JP | 2009-067360 A | 4/2009 |
| JP | 2015-151119 A | 8/2015 |
| JP | 2017-039472 A | 2/2017 |
| JP | 2020-066410 A | 4/2020 |
| WO | 2010067405 A1* | 6/2010 .................... B60J 1/18 |
| WO | 2017042697 A1* | 3/2017 ................. B29C 45/16 |

OTHER PUBLICATIONS

PCT International Search Report and Written Opinion (w/ English translation) for corresponding PCT Application No. PCT/JP2021/000558, mailed on Mar. 23, 2021, 14 pages.

* cited by examiner

VEHICLE TAILGATE

CROSS REFERENCE TO RELATED APPLICATIONS

This application is the U.S. National Stage Entry of International Application No. PCT/JP2021/000558 filed under the Patent Cooperation Treaty on Jan. 8, 2021, which claims priority to Japanese Patent Application No. 2020-012203 filed on Jan. 29, 2020, both of which are incorporated herein by reference.

TECHNICAL FIELD

The present disclosure relates to a tailgate of a vehicle.

BACKGROUND ART

As a tailgate (also called a rear gate, a back door, etc.) of a vehicle, there is known a tailgate having a tailgate main body formed by combining an inner panel and an outer panel that are made of resin (Patent Document 1). In this tailgate, a rear spoiler that protrudes rearward is formed by the outer panel in an upper portion of the tailgate main body, and an upper end portion of the rear window glass is disposed in a position spaced downward from the lower surface of the rear spoiler. The rear window glass is disposed in a forward inclined posture and is supported by the tailgate main body via a seal member.

PRIOR ART DOCUMENT(S)

Patent Document(s)

[Patent Document 1] JP2003-237370A

SUMMARY OF THE INVENTION

Task to Be Accomplished by the Invention

When mounting the rear window panel which is made of glass, resin, or the like to the tailgate main body, it is necessary to apply a force to the seal member and adhesive only in a direction normal to the rear window panel. In other words, it is necessary to move the rear window panel toward the mounting position from a position spaced from the mounting position of the rear window panel in the normal direction. For this reason, a space (mounting space) for mounting the rear window panel is provided between the upper end portion of the rear window glass and the lower surface of the rear spoiler (see FIG. 2 of Patent Document 1).

However, this space is easily seen from the rear, and after the mounting of the window glass, the presence of the space can be a factor that deteriorates the appearance of the tailgate.

In view of such background, an object of the present invention is to improve the appearance of a tailgate provided with a rear spoiler.

Means to Accomplish the Task

To achieve such an object, one embodiment of the present invention provides a tailgate (4) of a vehicle (1), comprising: a tailgate main body (7) having a rear window opening (6); a rear spoiler (13) extending rearward from a part of the tailgate main body above the rear window opening; a rear window panel (8) that is mounted on an outer peripheral portion (7b) of the rear window opening of an outer surface (7a) of the tailgate main body and closes the rear window opening; and a plate-shaped shield member (15) mounted on a lower surface (13b) of the rear spoiler so as to shield a space (16) defined between the lower surface of the rear spoiler and an upper end portion (8a) of the rear window panel.

According to this configuration, since the space formed between the lower surface of the rear spoiler and the upper end portion of the rear window panel is shielded by the shield member, the appearance of the tailgate can be improved.

Preferably, the rear window panel is bonded to the outer surface of the tailgate main body with an adhesive (18).

According to this configuration, it is possible to reliably mount the rear window panel on the tailgate main body with the adhesive. Also, the adhesive can ensure airtightness / watertightness of the mounting part.

Preferably, the tailgate main body includes an outer panel (11) and an inner panel (12) which are made of resin and are joined to each other, and the rear spoiler is integrally formed in the outer panel and the rear window panel is bonded to the outer panel below the rear spoiler.

According to this configuration, it is unnecessary to mount the rear spoiler member formed as a separate component to the tailgate main body, and the assembly work of the tailgate is easy. Also, since the tailgate main body includes the outer panel and the inner panel that are made of resin, the weight of the tailgate can be reduced compared to a case where the inner panel and the outer panel of the tailgate main body are press molded products made from a steel plate.

Preferably, the tailgate further comprises an engagement portion (31) provided on the lower surface of the rear spoiler and a corresponding engagement portion (32) provided on an upper surface of the shield member, wherein the engagement portion cooperates with the corresponding engagement portion to secure the shield member to be slidable in a fore and aft direction.

According to this configuration, since the shield member is secured to the rear spoiler to be slidable in the fore and aft direction by the engagement portion and the corresponding engagement portion, it is possible to shield most of the space with the shield member.

Preferably, the lower surface of the rear spoiler is formed with a step (22) extending in a width direction to define a forward-facing shoulder surface (21) with which a rear edge (15a) of the shield member contacts.

According to this configuration, with the rear edge of the shield member contacting the forward-facing shoulder surface of the rear spoiler, rearward slide of the shield member can be prevented.

Preferably, the shield member has a front edge (15b) curved downward in a forward direction and is in contact with the tailgate main body at the front edge.

According to this configuration, since the shield member contacts the tailgate main body at the curved front edge, the appearance of the connection part between the shield member and the tailgate main body is improved. Also, occurrence of a gap between the shield member and the tailgate main body can be suppressed.

Preferably, the engagement portion includes a shaft (33) protruding downward from the lower surface of the rear spoiler and a flange (34) provided on a lower end of the shaft, and the corresponding engagement portion includes a main body wall portion (37) integrally formed on the shield member and extending substantially in parallel with the lower surface of the rear spoiler at a position spaced upward from the upper surface of the shield member and a forward-opening engagement groove (36) formed in the main body wall portion and receiving the shaft therein.

According to this configuration, the engagement portion and the corresponding engagement portion can be provided so as not to appear on the lower surface of the shield member. Also, the structure for securing the shield member to the rear spoiler in a manner slidable in the fore and aft direction can be realized with a simple configuration.

Preferably, the outer surface of the tailgate main body includes a rear surface part (7c) that faces rearward in front of the space, and the tailgate further comprises a fastening part (41) provided in the rear surface part of the tailgate main body and a corresponding fastening part (42) provided in a front surface of the shield member, wherein the fastening part cooperates with the corresponding fastening part to restrict rearward displacement of the shield member.

According to this configuration, since the rearward displacement of the shield member is restricted by the fastening part and the corresponding fastening part, falling of the shield member from the rear spoiler can be prevented.

Preferably, the corresponding fastening part includes an engagement hole (44) formed in the front surface of the shield member, and the fastening part includes an elastic shaft (45) protruding rearward from the rear surface part of the tailgate main body to resiliently engage with the engagement hole.

According to this configuration, it is possible to make the elastic shaft resiliently engage with the engagement hole of the shield member by making the shield member slide forward, and the mounting / removing work of the shield member is easy.

Effect of the Invention

Thus, according to the present invention, the appearance of the tailgate can be improved.

MODE(S) FOR CARRYING OUT THE INVENTION

In the following, an embodiment of the present invention will be described in detail with reference to the drawings.

Figure 1:
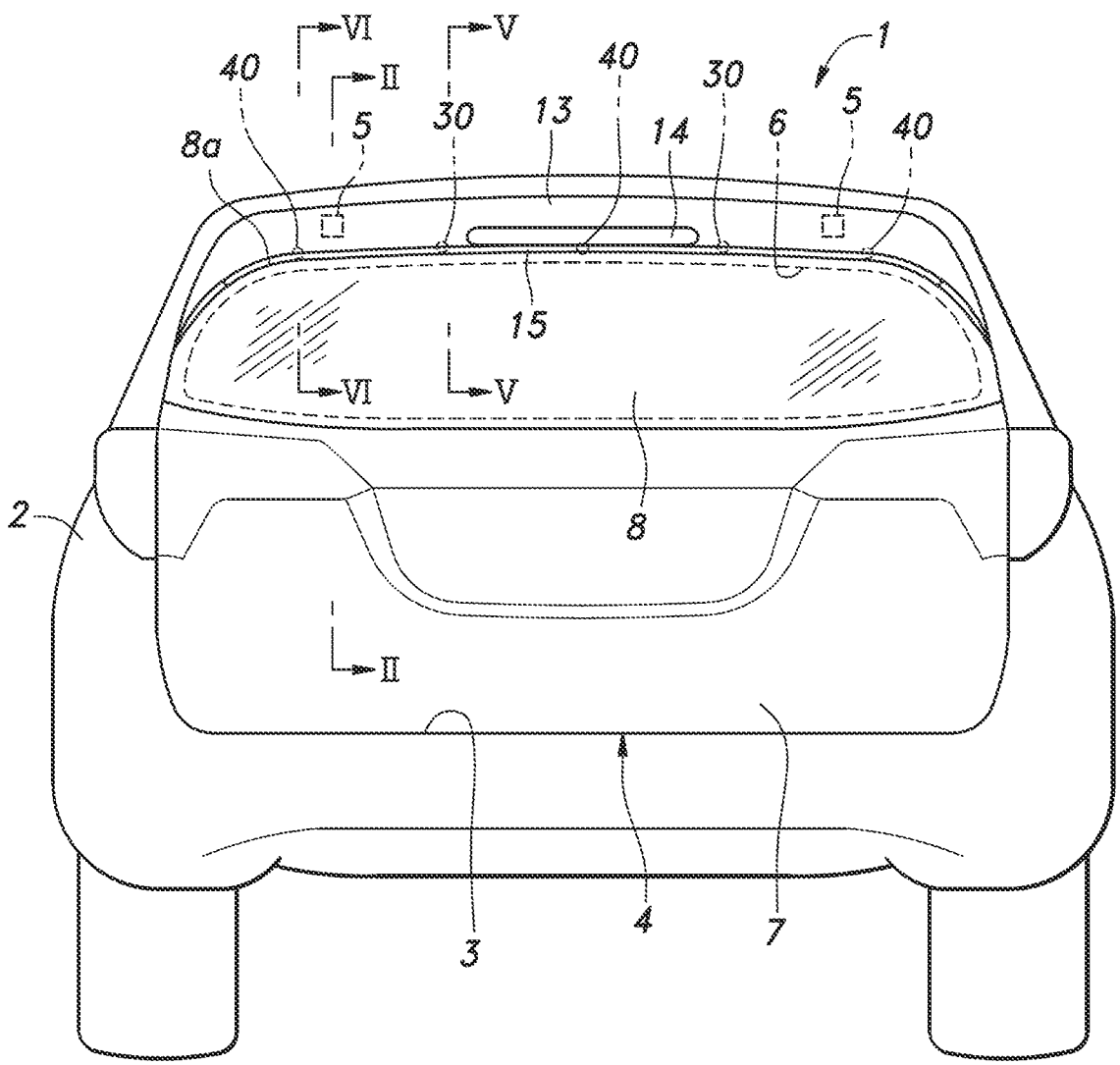
FIG. 1 is a rear view of a vehicle provided with a tailgate according to an embodiment of the present invention.

FIG. 1 is a rear view of a vehicle 1 provided with a tailgate 4 according to the embodiment. As shown in FIG. 1, the vehicle 1 is an automobile provided with a drive source such as an engine or a motor, and is provided with a tailgate 4 for selectively opening and closing a tailgate opening 3 formed in a rear portion of a vehicle body 2. The tailgate 4 is mounted to the vehicle body 2 by means of a pair of hinges 5 provided on left and right upper parts of an upper portion such that the tailgate 4 is pivotable in the up-down direction. The tailgate 4 includes a tailgate main body 7 having a rear window opening 6 formed in an upper portion thereof and a rear window panel 8 closing the rear window opening 6. The rear window panel 8 is a transparent or translucent plate member made of glass, resin, or the like, and is fixed to the tailgate main body 7.

Figure 2:
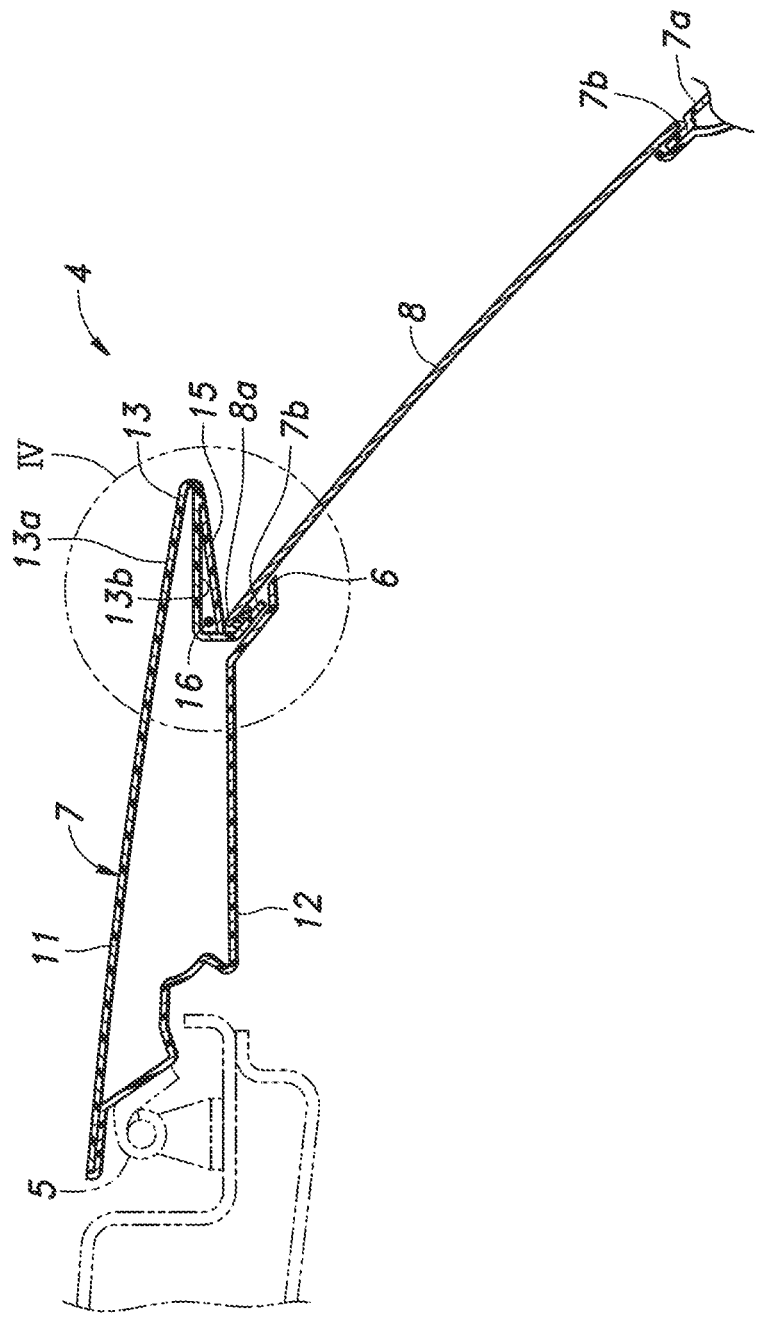
FIG. 2 is a sectional view of a main part of the tailgate taken along line II-II in FIG. 1.

FIG. 2 is a sectional view of a main part of the tailgate 4 taken along line II-II in FIG. 1. As shown in FIG. 2 also, in a state closing the tailgate opening 3, the tailgate 4 is mounted to the vehicle body 2 in a forward inclined posture in which the upper portion provided with the pair of hinges 5 is positioned forward of the lower portion.

The tailgate main body 7 has a hollow structure formed by joining an outer panel 11 and an inner panel 12 that are each made of resin. Here, "made of resin" means being formed of a material containing resin, and may contain a material other than resin. In the present embodiment, the outer panel 11 and the inner panel 12 are injection molded products made of a synthetic resin and are bonded to each other by an adhesive at an outer peripheral portion or the like. Note that the joining of the panels is not limited to this, and may be welding such as friction welding, ultrasonic welding, laser welding, and the like, hot melt adhesion, or mechanical fastening. Since the tailgate main body 7 has the outer panel 11 and the inner panel 12 that are made of resin and are joined to each other, the weight of the tailgate 4 is reduced compared to a case where the panels are press molded products made of a steel plate.

The upper portion of the tailgate main body 7 is provided with a rear spoiler 13 that extends rearward. The rear spoiler 13 is a part integrally formed with the outer panel 11 (integrally formed part) and extends rearward from a part of the tailgate main body 7 above the rear window opening 6. Since the rear spoiler 13 is integrally formed in the outer panel 11, it is unnecessary to mount the rear spoiler member formed as a separate component to the tailgate main body 7, and the assembly work of the tailgate 4 is easy.

The rear spoiler 13 has a width dimension similar to that of the tailgate main body 7, and is provided with a stop lamp 14 at a widthwise center thereof. An upper surface 13a of the rear spoiler 13 is inclined downward toward the rear so as to extend the roof upper surface of the vehicle body 2. On the other hand, the lower surface 13b of the rear spoiler 13 extends substantially horizontally.

A plate-shaped garnish 15 is mounted on the lower surface 13b of the rear spoiler 13. The garnish 15 is a shield member for shielding a space 16 formed between the lower surface 13b of the rear spoiler 13 and the upper end portion 8a of the rear window panel 8 and has a lower surface inclined downward toward the front. The garnish 15 is disposed such that the lower surface is visible from the rear and functions as a decorative member that improves the appearance of the rear spoiler 13. The detailed structure and mounting structure of the garnish 15 will be described later.

Figure 3:
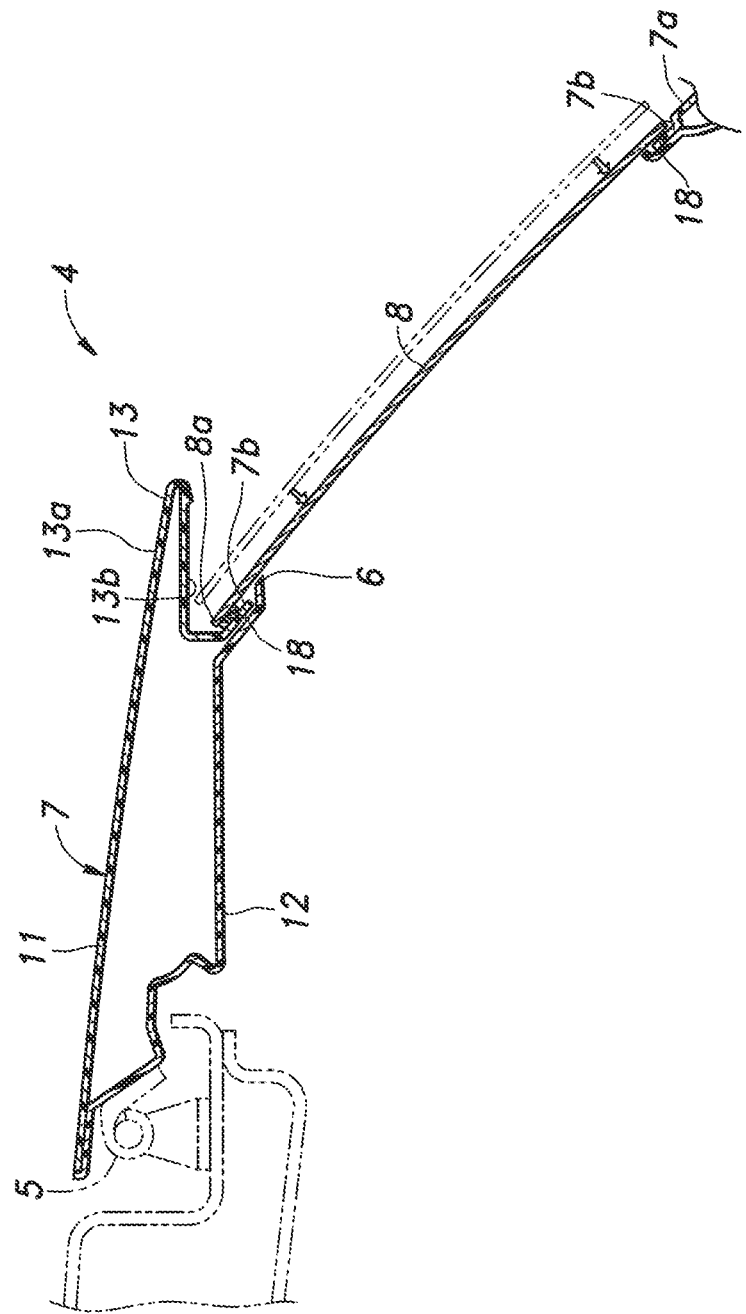
FIG. 3 is a sectional view corresponding to FIG. 2 when mounting a rear window panel.

Next, mounting of the rear window panel 8 will be described with reference to FIG. 3. FIG. 3 is a sectional view corresponding to FIG. 2 when mounting the rear window panel 8. The rear window panel 8 is mounted to the tailgate main body 7, with the garnish 15 not mounted on the rear spoiler 13. The rear window panel 8 is bonded to an outer surface 7a of the tailgate main body 7 with the adhesive 18. More specifically, the rear window panel 8 is bonded to an annular mounting surface 7b of the outer surface 7a of the tailgate main body 7 which is formed on an outer peripheral portion of the rear window opening 6. such that an outer peripheral edge of the rear window panel 8 is supported by the mounting surface 7b. As shown by an arrow, the rear window panel 8 is moved toward the mounting position from a position shown by an imaginary line (hereinafter referred to as a pre-mounting position) which is spaced from the mounting position on the mounting surface 7b in the normal direction, and is mounted to the tailgate main body 7.

Figure 4:
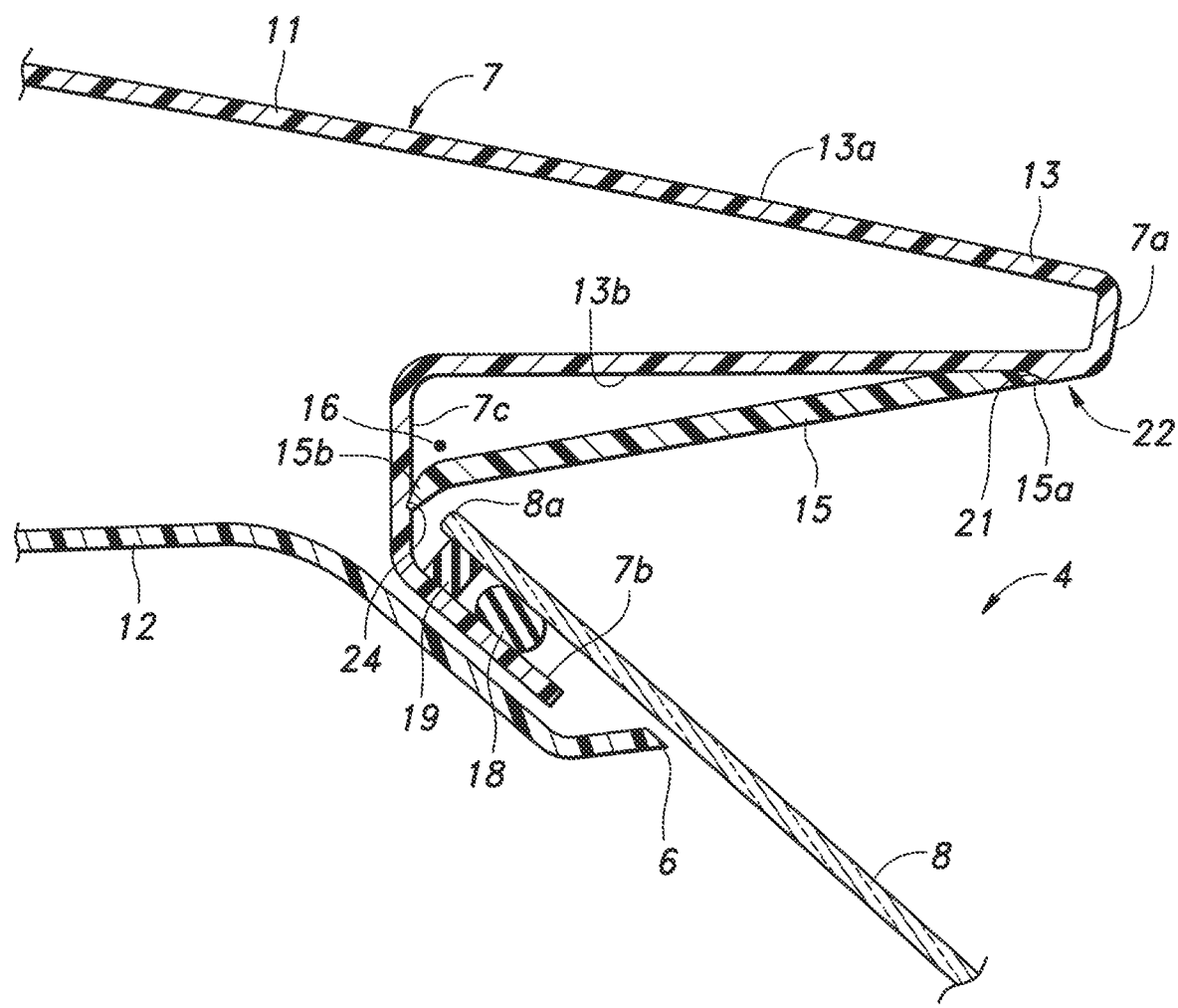
FIG. 4 is an enlarged sectional view of a part IV in FIG. 2.

FIG. 4 is an enlarged sectional view of a part IV in FIG. 2. Description is continued with reference to FIGS. 3 and 4. On the outer peripheral edge of the rear window panel 8, an adhesive 18 and an elastic member 19 are provided in parallel. The elastic member 19 functions as a spacer to keep a distance between the rear window panel 8 and the mounting surface 7b of the tailgate main body 7 and is bonded to the inner surface of the rear window panel 8 before mounting. The elastic member 19 also functions as a seal member after mounting of the rear window panel 8.

The adhesive 18 is applied on the inner surface of the rear window panel 8 at a position spaced from the elastic member 19 toward the inner circumference. The adhesive 18 may be an adhesive based on urethane resin. The adhesive 18 is applied to have a height higher than the elastic member 19. When the rear window panel 8 disposed in the pre-mounting position is moved to the mounting position, the adhesive 18 comes into contact with the mounting surface 7b and is bonded to the mounting surface 7b over a predetermined width due to contact of the elastic member 19 with the mounting surface 7b. By being bonded to the mounting surface 7b with the adhesive 18, the rear window panel 8 is reliably mounted to the tailgate main body 7. Also, the adhesive 18 ensures airtightness / watertightness of the mounting part.

As described above, the rear spoiler 13 extends rearward, and the rear window panel 8 is mounted to the vehicle body 2 in a forward inclined posture. Therefore, to prevent the upper end portion 8a of the rear window panel 8 from interfering with the rear spoiler 13, the outer panel 11 is shaped such that the rear spoiler 13 is spaced upward from the upper end portion 8a of the rear window panel 8 disposed in the mounting position. Thereby, the outer surface 7a of the tailgate main body 7 formed by the outer panel 11 is provided with a rear surface part 7c that faces rearward between the lower surface 13b of the rear spoiler 13 and the mounting surface 7b. The rear surface part 7c extends at an angle relative to the mounting surface 7b and connects the front end of the lower surface 13b of the rear spoiler 13 with the upper end of the mounting surface 7b. The rear surface part 7c of the present embodiment extends substantially in the vertical direction and is substantially perpendicular to the lower surface 13b of the rear spoiler 13.

The outer surface 7a of the tailgate main body 7 is thus shaped by the outer panel 11. Thereby, the aforementioned space 16 (mounting space) for enabling mounting of the rear window panel 8 is formed between the upper end portion 8a of the rear window panel 8 mounted to the tailgate main body 7 and the lower surface 13b of the rear spoiler 13. The rear surface part 7c is positioned in front of the space 16 and defines a front portion of the space 16.

After the rear window panel 8 is mounted to the tailgate main body 7, the garnish 15 is mounted on the lower surface 13b of the rear spoiler 13, as shown in FIG. 4. The garnish 15 is mounted on the lower surface 13b of the rear spoiler 13 in an inclined posture to be inclined upward toward the rear and defines a space between itself and the lower surface 13b of the rear spoiler 13 which extends substantially horizontally such that the space is larger in the front portion than in the rear portion. The garnish 15 is an injection molded product made of resin and is provided with the same color as that of the rear spoiler 13 by painting, for example.

A rear portion of the lower surface 13b of the rear spoiler 13 is formed with a step 22 which extends in the width direction and defines a forward-facing shoulder surface 21. The rear edge 15a of the garnish 15 is positioned forward of the forward-facing shoulder surface 21 and contacts the forward-facing shoulder surface 21. The rear edge 15a of the garnish 15 has a tapered shape and is disposed such that the lower surface thereof is flush with a part of the lower surface 13b of the rear spoiler 13 rearward of the step 22.

The front edge 15b of the garnish 15 is curved downward in the forward direction and has a lip shape that is thinner toward the tip. A part of the rear surface part 7c of the tailgate main body 7 opposing the front edge 15b of the garnish 15 is formed with a widthwise-extending horizontal groove 24 which has a substantially V-shaped cross section and defines an upward-facing shoulder surface smaller than the forward-facing shoulder surface 21. The front edge 15b of the garnish 15 protrudes into the horizontal groove 24 and contacts the rear surface part 7c of the tailgate main body 7. The horizontal groove 24 and the front edge 15b of the garnish 15 are arranged at a position same as or slightly lower than the position of the upper end portion 8a of the rear window panel 8.

As shown in FIG. 1, the garnish 15 is mounted to the tailgate main body 7 by multiple first mounting structures 30 and multiple second mounting structures 40 disposed at different positions in the width direction. In the illustrated example, two first mounting structures 30 are disposed to the left and right of the garnish 15, and three second mounting structures 40 are disposed at the center, in the vicinity of the left end, and in the vicinity of the right end of the garnish 15.

Figure 5:
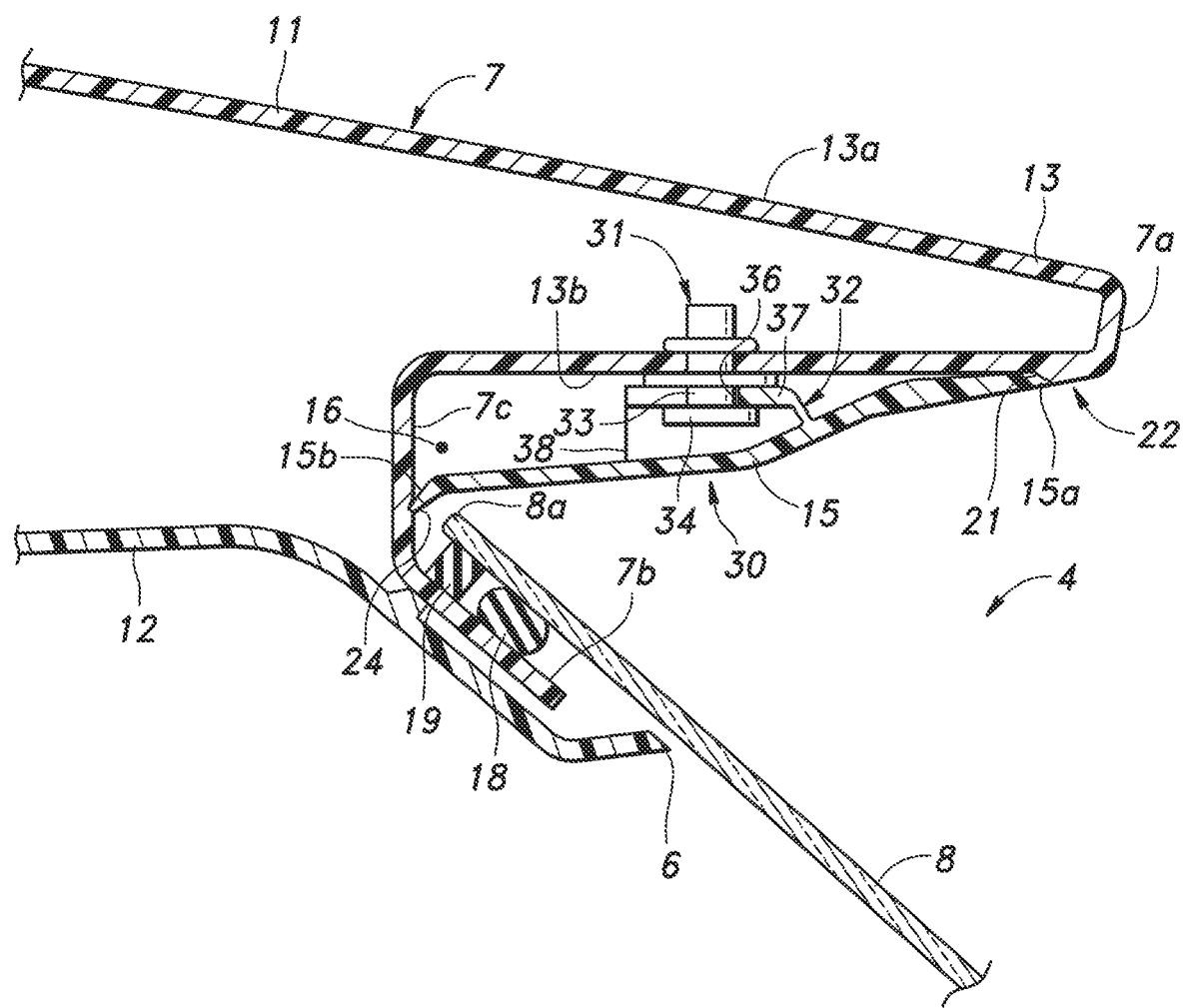
FIG. 5 is an enlarged sectional view of a main part of the tailgate taken along line V-V in FIG. 1.

FIG. 5 is an enlarged sectional view of a main part of the tailgate 4 taken along line V-V in FIG. 1. As shown in FIG. 5, the first mounting structure 30 is configured to include an engagement portion 31 provided on the lower surface 13b of the rear spoiler 13 and a corresponding engagement portion 32 provided on the upper surface of the garnish 15. The engagement portion 31 includes a shaft 33 fixed to a wall constituting the lower surface 13b of the rear spoiler 13 and protruding downward from the lower surface 13b of the rear spoiler 13 and a flange 34 provided at the lower end of the shaft 33.

The corresponding engagement portion 32 is constituted of a wall body integrally formed with the garnish 15, and includes an engagement groove 36 formed in the wall body. The wall body includes a main body wall portion 37 which extends substantially in parallel with the lower surface 13b of the rear spoiler 13 at a position spaced upward from the upper surface of the garnish 15 and a support wall 38 which couples the rear portion and the left and right side portions of the main body wall portion 37 with the garnish 15 and supports the main body wall portion 37. Between the main body wall portion 37 and the upper surface of the garnish 15, a space opened forward is formed. The engagement groove 36 is formed in the main body wall portion 37 as a notch groove that extends rearward from the front end of the main body wall portion 37 and is opened forward, and has a width larger than the diameter of the shaft 33 and smaller than the diameter of the flange 34.

The garnish 15 is mounted to the rear spoiler 13 by being moved under the rear spoiler 13 from the rear to the front. At this time, the engagement groove 36 receives the shaft 33. Thereby, the engagement portion 31 and the corresponding engagement portion 32 cooperate to secure the garnish 15 to the rear spoiler 13 to be slidable in the fore and aft direction and not to be displaceable in the vertical direction.

In this way, since the garnish 15 is secured to the rear spoiler 13 to be slidable in the fore and aft direction by the engagement portion 31 and the corresponding engagement portion 32, it is possible to shield most of the space 16 with the garnish 15. Also, since the engagement portion 31 and the corresponding engagement portion 32 are configured as above, they are provided so as not to appear on the lower surface of the garnish 15. Further, the structure for securing the garnish 15 to the rear spoiler 13 in a manner slidable in the fore and aft direction is realized with a simple configuration.

When the garnish 15 is moved forward to be mounted, the garnish 15 and the wall body undergo elastic deformation, so that the rear edge 15*a* of the garnish 15 rides over the rear portion of the step 22 and comes into contact with the forward-facing shoulder surface 21. Thus, since the lower surface 13*b* of the rear spoiler 13 is formed with the step 22 defining the forward-facing shoulder surface 21 and the rear edge 15*a* of the garnish 15 comes into contact with the forward-facing shoulder surface 21, rearward slide of the garnish 15 is prevented.

Also, when mounting the garnish 15, due to the elastic deformation of the garnish 15 and the wall body, the front edge 15*b* of the garnish 15 rides over the upper end portion 8*a* of the rear window panel 8 and comes into contact with the tailgate main body 7 while protruding into the horizontal groove 24. In this way, since the garnish 15 has the front edge 15*b* curved downward in the forward direction and comes into contact with the tailgate main body 7 at the front edge 15*b*, the appearance of the connection part between the garnish 15 and the tailgate main body 7 is improved. Also, occurrence of a gap between the garnish 15 and the tailgate main body 7 is suppressed. Further, in the present embodiment, since the front edge 15*b* of the garnish 15 is disposed at a position lower than the upper end portion 8*a* of the rear window panel 8, the connection part between the garnish 15 and the tailgate main body 7 is substantially not visible from the rear, and this improves the appearance further.

Figure 6:
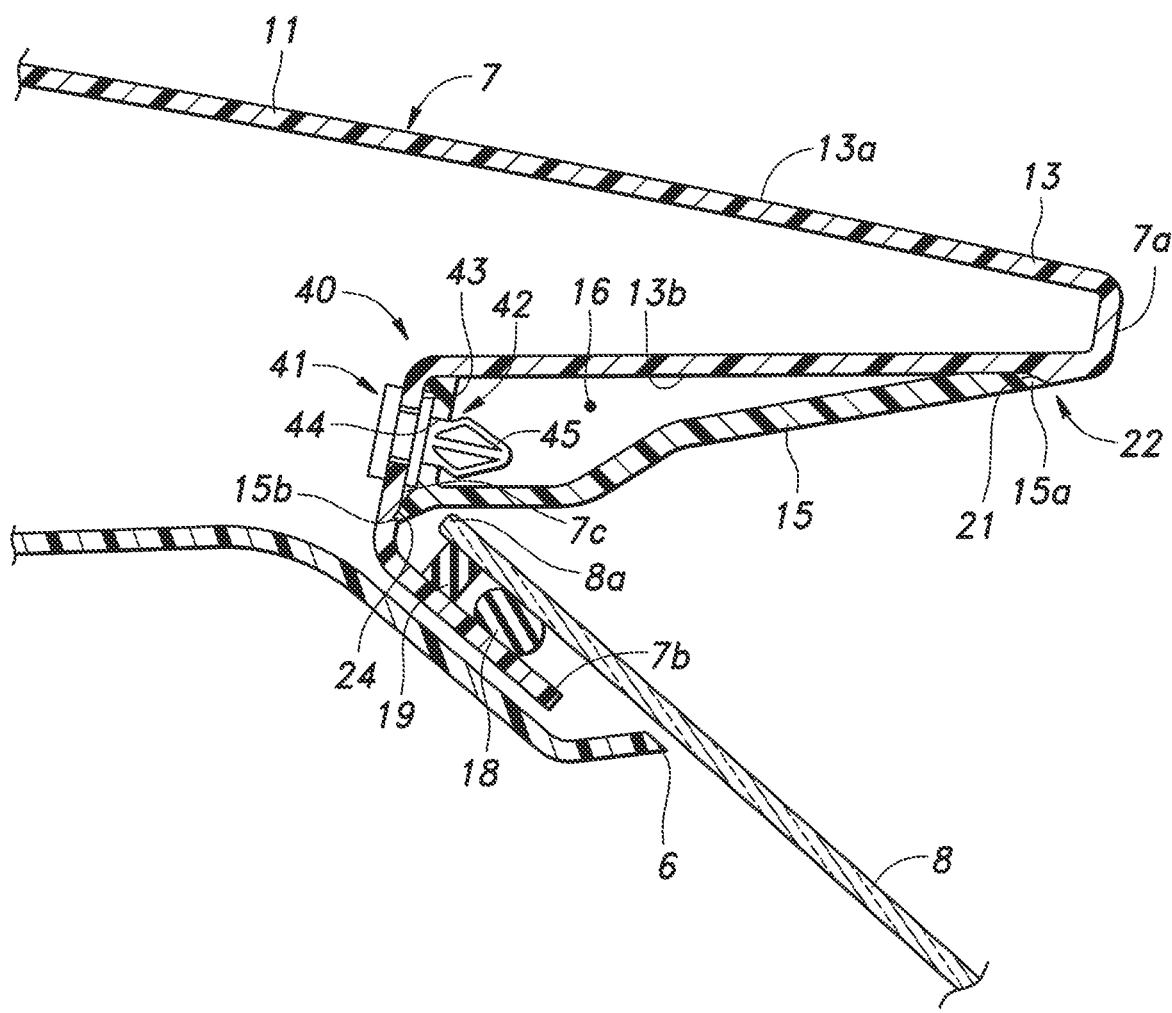
FIG. 6 is an enlarged sectional view of a main part of the tailgate taken along line VI-VI in FIG. 1.

FIG. 6 is an enlarged sectional view of a main part of the tailgate 4 taken along line VI-VI in FIG. 1. As shown in FIG. 6, the second mounting structure 40 is configured to include a fastening part 41 provided on the rear surface part 7*c* of the tailgate main body 7 and a corresponding fastening part 42 provided on the front surface of the garnish 15. The corresponding fastening part 42 includes a vertical wall 43 formed on the front portion of the garnish 15 and an engagement hole 44 formed in the front surface of the vertical wall 43. The fastening part 41 includes an elastic shaft 45 fixed to the tailgate main body 7 and protruding rearward from the rear surface part 7*c* of the tailgate main body 7. The elastic shaft 45 can elastically deform in the radial direction, and when the garnish 15 is moved forward to be mounted, enters the engagement hole 44 to be resiliently engaged with the engagement hole 44. Thereby, the fastening part 41 and the corresponding fastening part 42 cooperate with each other to restrict rearward displacement of the garnish 15.

In this way, since the rearward displacement of the garnish 15 is restricted by the fastening part 41 and the corresponding fastening part 42, falling of the garnish 15 from the rear spoiler 13 can be prevented. Also, since the corresponding fastening part 42 includes the engagement hole 44 and the fastening part 41 includes the elastic shaft 45 configured to be resiliently engaged with the engagement hole 44, the elastic shaft 45 is brought into resilient engagement with the engagement hole 44 of the garnish 15 when sliding the garnish 15 forward. Therefore, the mounting / removing work of the garnish 15 is easy.

The tailgate 4 is configured as described above. Thus, the tailgate 4 is provided with the plate-shaped garnish 15, and the garnish 15 is mounted on the lower surface 13*b* of the rear spoiler 13 so as to shield the space 16 formed between the lower surface 13*b* of the rear spoiler 13 and the upper end portion 8*a* of the rear window panel 8. Therefore, the appearance of the tailgate 4 is improved.

Concrete embodiments of the present invention have been described in the foregoing, but the present invention is not limited to the above embodiments and may be modified or altered in various ways. For example, the concrete structure, arrangement, number, material, procedure, etc. of each member or part described in the foregoing embodiments may be appropriately changed without departing from the spirit of the present invention. Also, not all of the components shown in the foregoing embodiments are necessarily indispensable and they may be selectively adopted as appropriate.

LIST OF REFERENCE NUMERALS

1 vehicle
3 tailgate opening
4 tailgate
6 rear window opening
7 tailgate main body
7*a* outer surface
7*b* mounting surface (outer peripheral portion of the rear window opening 6 of the outer surface 7*a*)
7*c* rear surface part
8 rear window panel
8*a* upper end portion
11 outer panel
12 inner panel
13 rear spoiler
13*b* lower surface
15 garnish (shield member)
15*a* rear edge
15*b* front edge
16 space
18 adhesive
21 forward-facing shoulder surface
24 horizontal groove
30 first mounting structure
31 engagement portion
32 corresponding engagement portion
33 shaft
34 flange
36 engagement groove
40 second mounting structure
41 fastening part
42 corresponding fastening part
44 engagement hole
45 elastic shaft

The invention claimed is:
1. A tailgate of a vehicle, comprising:
a tailgate main body having a rear window opening;
a rear spoiler integrally formed with the tailgate main body and extending rearward from a part of the tailgate main body above the rear window opening; and
a rear window panel that is bonded to an outer peripheral portion of the rear window opening of an outer surface of the tailgate main body with an adhesive and closes the rear window opening,
wherein the rear spoiler is present in a normal direction of the outer peripheral portion of the rear window opening to which the rear window panel is bonded, and a space is defined between a lower surface of the rear spoiler and an upper end portion of the rear window panel, and a plate-shaped shield member is mounted on the lower surface of the rear spoiler so as to shield the space as viewed from rear.

2. The tailgate of the vehicle according to claim 1, wherein the tailgate main body includes an outer panel and an inner panel which are made of resin and are joined to each other, and the rear spoiler is integrally formed in the outer panel and the rear window panel is bonded to the outer panel below the rear spoiler.

3. The tailgate of the vehicle according to claim 1, further comprising an engagement portion provided on the lower surface of the rear spoiler and a corresponding engagement portion provided on an upper surface of the shield member, wherein the engagement portion cooperates with the corresponding engagement portion to secure the shield member to be slidable in a fore and aft direction.

4. The tailgate of the vehicle according to claim 3, wherein the lower surface of the rear spoiler is formed with a step extending in a width direction to define a forward-facing shoulder surface with which a rear edge of the shield member contacts.

5. The tailgate of the vehicle according to claim 4, wherein the shield member has a front edge curved downward in a forward direction and is in contact with the tailgate main body at the front edge.

6. The tailgate of the vehicle according to claim 3, wherein the engagement portion includes a shaft protruding downward from the lower surface of the rear spoiler and a flange provided on a lower end of the shaft, and the corresponding engagement portion includes a main body wall portion integrally formed on the shield member and extending substantially in parallel with the lower surface of the rear spoiler at a position spaced upward from the upper surface of the shield member and a forward-opening engagement groove formed in the main body wall portion and receiving the shaft therein.

7. The tailgate of the vehicle according to claim 3, wherein the outer surface of the tailgate main body includes a rear surface part that faces rearward in front of the space, and the tailgate further comprises a fastening part provided in the rear surface part of the tailgate main body and a corresponding fastening part provided in a front surface of the shield member, wherein the fastening part cooperates with the corresponding fastening part to restrict rearward displacement of the shield member.

8. The tailgate of the vehicle according to claim 7, wherein the corresponding fastening part includes an engagement hole formed in the front surface of the shield member, and the fastening part includes an elastic shaft protruding rearward from the rear surface part of the tailgate main body to resiliently engage with the engagement hole.

* * * * *